United States Patent
Das et al.

(10) Patent No.: US 11,205,078 B2
(45) Date of Patent: Dec. 21, 2021

(54) SYSTEM FOR COMPUTATIONALLY EFFICIENT ANALYSIS OF TRAFFIC DETAILS IN TRAFFIC VIDEO STREAM AND A METHOD THEREOF

(71) Applicant: VIDEONETICS TECHNOLOGY PRIVATE LIMITED, Kolkata (IN)

(72) Inventors: Sudeb Das, Asansol (IN); Monotosh Das, Kolkata (IN); Tuhin Bose, Kolkata (IN)

(73) Assignee: VIDEONETICS TECHNOLOGY PRIVATE LIMITED, Kolkata (IN)

( * ) Notice: Subject to any disclaimer, the term of this patent is extended or adjusted under 35 U.S.C. 154(b) by 0 days.

(21) Appl. No.: 16/975,999

(22) PCT Filed: Feb. 25, 2019

(86) PCT No.: PCT/IN2019/050148
§ 371 (c)(1),
(2) Date: Aug. 26, 2020

(87) PCT Pub. No.: WO2019/162969
PCT Pub. Date: Aug. 29, 2019

(65) Prior Publication Data
US 2021/0103735 A1    Apr. 8, 2021

(30) Foreign Application Priority Data
Feb. 26, 2018    (IN) .............................. 201831007207

(51) Int. Cl.
*G06K 9/00*    (2006.01)

(52) U.S. Cl.
CPC ................................ *G06K 9/00744* (2013.01)

(58) Field of Classification Search
CPC ........... G06K 9/00744; G06K 9/00785; G08G 1/0116; G08G 1/0175; G08G 1/0133
See application file for complete search history.

(56) References Cited

U.S. PATENT DOCUMENTS

| | | | |
|---|---|---|---|
| 6,252,975 B1 | 6/2001 | Bozdagi et al. | |
| 2011/0096149 A1 | 4/2011 | Au et al. | |
| 2013/0088600 A1* | 4/2013 | Wu | G08G 1/054 348/149 |
| 2018/0336781 A1* | 11/2018 | Jin | G08G 1/07 |

OTHER PUBLICATIONS

International Search Report for corresponding International Application No. PCT/IN2019/050148, dated Jul. 8, 2019.

* cited by examiner

*Primary Examiner* — Syed Haider
(74) *Attorney, Agent, or Firm* — Pearl Cohen Zedek Latzer Baratz LLP (57) ABSTRACT

The present invention discloses a system for selection of candidate video frames from traffic video comprising an imaging processor operatively connected to traffic video source. The imaging processor receives the traffic video from said source for selection of candidate video frames from the received traffic video for analysis of entire traffic video stream to extract vehicles details from therefrom including detection of situations of moving vehicles and non-moving vehicles. The traffic video is forwarded to the imaging processor from the source at an appropriate rate suitable for said candidate frames selection computation.

13 Claims, 6 Drawing Sheets

SYSTEM FOR COMPUTATIONALLY EFFICIENT ANALYSIS OF TRAFFIC DETAILS IN TRAFFIC VIDEO STREAM AND A METHOD THEREOF

CROSS-REFERENCE TO RELATED APPLICATIONS

This application is a National Phase Application of PCT International Application No. PCT/IN2019/050148, International Filing Date Feb. 25, 2019, claiming the benefit of India Patent Application No. 201831007207, filed Feb. 26, 2018, which are hereby incorporated by reference.

FIELD OF THE INVENTION

The present invention relates to intelligent selection of candidate image frames for real-time traffic video analytics. More specifically, the present invention is directed to develop a system and method for computationally efficient analysis of vehicular traffic video stream for extracting vehicles details in continuously flowing or static traffic including detection of the situations of moving vehicles and non-moving vehicles for a long time period.

BACKGROUND OF THE INVENTION

Most of the existing video based traffic monitoring systems require high computing environment to produce acceptable accuracy along with high FPS processing capability. Even though, there exists several motion based frame and search space reduction or selection schemes—but these methods often fail to achieve desired reduction of computation.

This is because often these techniques overlook several intrinsic physical properties of the video scene which might help to further reduce the computational requirements and produce better results. For example, processing the original resolution image for reduction of frame and search space is an overhead. Similarly, spatial positions of the vehicles (entering the field-of-view (FOV) or existing from the FOV) also provide useful clues to reduce the computation. Therefore, there is a need for developing an effective frame and search space reduction or selection scheme for efficient video based real-time traffic monitoring.

Moreover, there exist two traffic situations prevailing in many cases—a) moving traffic and b) non-moving traffic for a long time period. These two situations are contradictory in nature—and require different processing strategies for producing high FPS with accurate traffic monitoring.

In the first situation when there is a moving traffic on a road for a long time period, most of the existing video analytics systems become overloaded, and traditional frame buffering mechanisms often fail (frame buffer overflow) to handle this situation. This is because in this situation it becomes difficult to come up with a constant buffer size. One simple solution to this problem is to use high computing environment for video analytics which is often unavailable in case of city-wise traffic monitoring (like Smart city projects) due to high cost and budget constraints. Therefore, there is a need to develop effective solution to reduce computation overhead.

In the second situation when vehicles remain stand-still in the FOV for a long period of time (like cross-roads/road-junctions with traffic light monitoring, congestion etc.), most of the existing motion-based video analytics systems discard all the frames without any/or little motion in it. On the contrary, detection and recognition of objects-of-interest (OOI) (like license plates (LPs)) is easier when the vehicle is not in motion. This is due to the limitations of cameras/lenses—frame with motion often contains noises (like motion blurring etc.) which is not present in no-motion frames. Moreover, due to light/contrast/color saturation objects in no-motion frames are of higher quality than the visual quality of objects in motion frames. Furthermore, no motion can be found in two situations—1) frames with empty FOV and 2) frames with non-moving vehicles. Most of the existing video analytics systems treat similarly both the above mentioned situations and discard all the frames with no motions from further processing. As a result, no motion frames with non-moving vehicles are discarded and useful information gets lost. Moreover, even if it becomes possible to separate no-motion frames occurring due to no vehicle in the FOV from the no-motion frames occurring due to non-moving vehicles, processing each no-motion frames with non-moving vehicles is not necessary as the scene remains practically unchanged. Therefore, there is a need to develop efficient solution to effectively select frames with non-moving vehicles for further processing.

REFERENCES

1. Real-time hyper-lapse video creation via frame selection—US 2017/0359548 A1, December 2017
2. Methods for controlling video decoder to selectively skip one or more video frames and related signal processing apparatuses thereof—US 2017/0332079 A1, November, 2017
3. Frame dropping method for video frame and video sending apparatus—US 2017/0347158 A1, November, 2017
4. Frame rate control method and apparatus for encoding image based on threshold value—U.S. Pat. No. 9,712,827 B2, July, 2017
5. Method and apparatus for intelligent video pruning—US 2017/0039729 A1, February, 2017
6. Effective and efficient human action recognition using dynamic frame skipping and trajectory rejection—Img. Vis. Comp., June 2016.

OBJECT OF THE INVENTION

It is thus the basic object of the present invention is to develop a system and method for computationally efficient analysis of vehicular traffic video stream for extracting vehicles details in continuously flowing or static traffic including detection of the situations of moving vehicles and non-moving vehicles for a long time period.

Another object of the present invention is to develop a system for computationally efficient analysis of vehicular traffic video stream for extracting vehicles details in continuously flowing traffic in real time.

Another object of the present invention is to develop a system for computationally efficient analysis of traffic details in video stream for detection of vehicles status in continuously flowing traffic implementing adaptive ROI and adaptive FPS selection in the video stream for effectively select frames for further processing in long non-moving traffic situation.

Yet another object of the present invention is to develop a system for computationally efficient analysis of traffic details in video stream for detection of vehicles status in continuously flowing traffic implementing adaptive ROI and adaptive FPS selection in the video stream for effectively selecting frames by differentiating non-motion frames due to absence of vehicles from the frames with non-moving vehicles.

SUMMARY OF THE INVENTION

Thus according to the basic aspect of the present invention there is provided a system for selection of candidate video frames from traffic video comprising imaging processor operatively connected to traffic video source;

said imaging processor receives the traffic video from said source for selection of candidate video frames from the received traffic video for analysis of entire traffic video stream to extract vehicles details from therefrom including detection of situations of moving vehicles and non-moving vehicles;

said traffic video is forwarded to the imaging processor from the source at an appropriate rate suitable for said candidate frames selection computation.

In a preferred embodiment of the present system, the imaging processor comprises a FPS calculator to receive the traffic video from the source and forwarding the video frames of said received traffic video at a selected frame per second (FPS) and with a selected region of importance (ROI) for each forwarding video frame;

a motion region detector to receive the forwarded video frames and analyzes each of the frame to determine whether the received video frames corresponds to no-motion frames or motion frames;

motion frame processing module operatively interfaced with the motion region detector to receive the motion frames and discarding irrelevant motion frames from the vehicles details extracting analysis to reduce computational overloading situation caused by the moving vehicles; and non-motion frame processing module operatively interfaced with the motion region detector to receive the non-motion frames for distinguishing the no-motion frames whether corresponding to no-vehicle or non-moving vehicle and discarding only the no-motion frames corresponding to the no-vehicle from the vehicles details extracting analysis.

In a preferred embodiment of the present system, the video source includes traffic surveillance camera or image grabber and decoder module.

In a preferred embodiment of the present system, the FPS calculator is adapted to select the FPS and the ROI based on computational load during candidate frames selection including adaptively selecting smaller ROI for each of the video frames being forwarded and/or reducing the FPS adaptively to reduces the computational load.

In a preferred embodiment of the present system, the FPS calculator enables FPS control by involving a FPS control unit to enable FPS control whereby target FPS suitable for the computational load determined by the FPS calculator is communicated to the FPS control unit which is operatively interfaced to the traffic surveillance camera or image grabber and decoder module to change image capturing rate as per the target FPS and forward the video to the FPS calculator as per the target FPS.

In a preferred embodiment of the present system, the FPS calculator is configured to continuously measure of the computation load based on current FPS of the video frames and time taken to process the video frames during any prefixed duration of time, wherein for total time taken to process the video frames is more than difference in timestamp between last frame and first frame in said time duration, the FPS calculator infers overload condition with exiting ROI and existing FPS.

In a preferred embodiment of the present system, the FPS calculator reduces the ROI by a fixed amount and/or the FPS by similar percentage in the overload condition thus enabling processing of fewer video frames per second with reduced ROI to reduce the computational load and when the total time required to process all the video frames during a certain interval of time is much less than the difference between the last frame and the first frame during that time duration, it increases the ROI and fps.

In a preferred embodiment of the present system, the motion region detector is adapted to identify the motion regions for the frames in compressed domain involving frame differencing method between two consecutive frames applying connected component analysis and spatial position constraint to discard certain connected components based on their positions in field of view (FOV).

In a preferred embodiment of the present system, the motion frame processing module includes an Interestedness (Ir) measure calculator to receive the motion frames with marked ROI and calculate Ir value involving characteristics of the video frames and their application including edge characteristic, vehicle position in the FOV; and a frame selector module to decide which frames to be discarded and which frames to be processed further based on the Ir value.

In a preferred embodiment of the present system, the non-motion frame processing module distinguishes the no-motion frames whether corresponding to no-vehicle or non-moving vehicle in the FOV based on edge concentration.

In a preferred embodiment of the present system, the non-motion frame processing module sends frame block signal (FBS) information to FPS control unit for the FPS control including reducing or stopping the image capturing upon detection of no vehicle present in the FOV.

In a preferred embodiment of the present system, the non-motion frame processing module distinguishes the no-motion frames whether corresponding to no-vehicle or non-moving vehicle in the FOV including checking number of consecutive no-motion frames with respect to a previously set no-motion frame counter threshold;

passing the no-motion frames to edge density based non-moving vehicle presence detection module for further analysis if the number of consecutive no-motion frames is reached to the previously set no-motion frame counter threshold, otherwise the no-motion frames are discarded from further processing;

checking edge-density of the frames in the edge-density based non-moving vehicle presence detection module to determine whether there exists any non-moving vehicle in the FOV and discarding the frames from further processing which do not corresponds to any non-moving vehicle in the FOV while rest of the frames are passed to further analysis.

According to another aspect in the present invention there is provided a method for selecting candidate video frames from traffic video involving the above system, comprising receiving the traffic video from the traffic video source in the imaging processor;

selecting the candidate video frames from the received traffic video in the imaging processor for analysis of entire traffic video stream to extract vehicles details from therefrom including detection of situations of moving vehicles and non-moving vehicles; and controlling the traffic video is forwarded to the imaging processor from the source at an appropriate rate suitable for the candidate frames selection computation.

In a preferred embodiment of the above method, wherein selection of the candidate video frames from the received traffic video in the imaging processor for analysis of entire traffic video stream to extract vehicles details from therefrom including detection of situations of moving vehicles and non-moving vehicles comprises the steps of receiving the traffic video from the source in the FPS calculator and forwarding the video frames of said received traffic video at a selected frame per second (FPS) and with a selected region of importance (ROI) for each forwarding video frame;

receiving the forwarded video frames in the motion region detector and analyzing each of the frame to determine whether the received video frames corresponds to no-motion frames or motion frames;

involving the motion frame processing module operatively interfaced with the motion region detector to receive the motion frames and discarding irrelevant motion frames from the vehicles details extracting analysis to reduce computational overloading situation caused by the moving vehicles;

involving the non-motion frame processing module operatively interfaced with the motion region detector to receive the non-motion frames for distinguishing the no-motion frames whether corresponding to no-vehicle or non-moving vehicle and discarding only the no-motion frames corresponding to the no-vehicle from the vehicles details extracting analysis; and enabling the FPS control by involving the FPS control unit whereby target FPS suitable for the computational load determined by the FPS calculator is communicated to the FPS control unit which is operatively interfaced to the source to change image/video capturing rate of the source as per the target FPS and forward the video to the FPS calculator as per the target FPS.

DESCRIPTION OF THE INVENTION WITH REFERENCE TO THE ACCOMPANYING DRAWINGS

The present invention discloses a system and method for computation efficient analysis of traffic details in video stream. In one embodiment, an interestedness measure of video frames is calculated to select frames from a video stream and it is described in the context of analysis of vehicle details in a continuously flowing traffic. In another embodiment, motion and edge-density based scheme is described for selecting the frames for further analysis in a long non-flowing traffic situation. In another embodiment, a method for selection of region of interest is proposed. In another embodiment, method for search-space reduction technique based on motion-based filtration with high FPS throughput is described.

It is, therefore, one aspect of the disclosed embodiments to provide a system for selecting candidate frames for real-time traffic video analytics.

It is, therefore, one aspect of the disclosed embodiments to provide a system for an effective motion based frame and search space filtration scheme to support high FPS processing.

It is, therefore, one aspect of the disclosed embodiments to provide a system for adaptive ROI and adaptive FPS selection in long moving traffic environment.

It is, therefore, one aspect of the disclosed embodiments to provide a system for differentiating non-motion frames due to no vehicle or non-moving vehicle.

It is, therefore, one aspect of the disclosed embodiments to provide a system for effectively select frames for further processing in long non-moving traffic situation.

Figure 1:
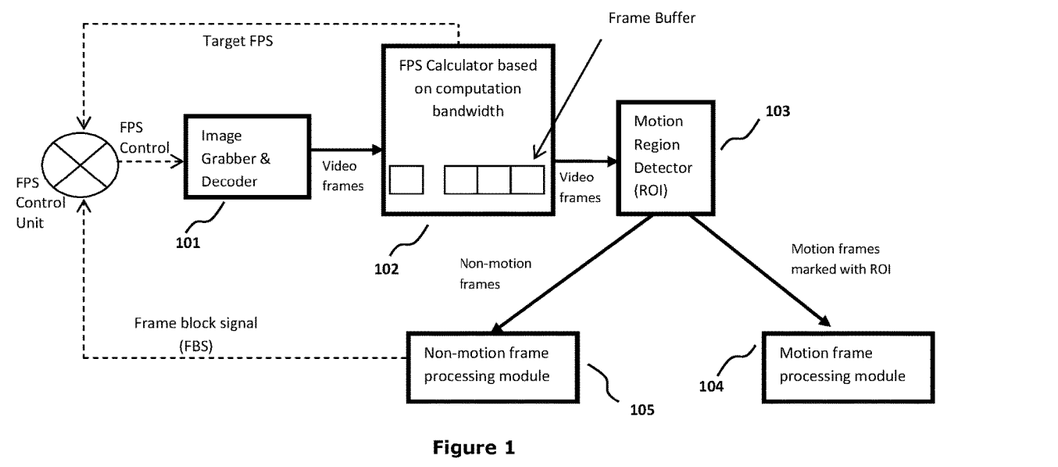
FIG. 1 depicts an overall block diagram of the system and the modules implemented in accordance with the disclosed embodiments regarding candidate frame categorization and selection.

The accompanying FIG. 1 depicts the overall block diagram of the system and method for candidate frames selection for their real-time analysis. The [101] can be any input video (plurality of images/frame) source such as traffic surveillance camera or image grabber and decoder module. The input video (plurality of images/frame) from the source [101] is forwarded to an operatively connected imaging processor for candidate frames selection at an appropriate rate suitable for candidate frames selection computation as specified by the imaging processor itself. The imaging processor embodies a FPS (frame per second) calculator [102], FPS control unit, Motion region detector [103], motion frame processing module [104] and Non-motion frame processing module [105].

Upon receiving the video from the source [101], the FPS (frame per second) calculator [102] of the processor first determines that whether the system is overloaded (unhealthy) or not (healthy). This overloading can be due to many reasons such that availability of low-computing environment, long moving traffic situation, existence of high amount of noise/turbulence in the video for a long time etc. In this overloading situation, the FPS calculator [102] reduces the computational load to the system by adaptively selecting smaller ROI (region of importance) for each frame and/or reducing the FPS adaptively while forwarding the frames of the received video. The FPS calculator [102] enables FPS control by involving the FPS control unit as shown in the FIG. 1. The target FPS suitable for the computational load of the present system during candidate frames selection as determined by the FPS calculator [102] is communicated to the FPS control unit which is operatively interfaced to the traffic surveillance camera or image grabber and decoder module to change image capturing rate as per the target FPS and forward the video to the FPS calculator as per the target FPS.

The subsequent Motion region detector [103] of the present system receives the video frames forwarded by the FPS calculator [102] and analyzes each of them to determine whether the received video frames comprises no-motion frame corresponding to either no-vehicle in the FOV or non-moving vehicle in the FOV. If the received video frames found comprises no-motion frame then it is forwarded to the Non-motion frame processing module [105] for further processing otherwise the received frames which are basically the motion frame are forwarded to the motion frame processing module [104] for further processing.

As for the operation of the FPS calculator for selecting smaller ROI and/or reducing the FPS adaptively, it is important to note that selection of smaller ROI and reduction of fps are two tradeoffs that are proposed when the existing computing resource becomes insufficient to handle the full load of computation. For this, the video frames are analyzed to extract information from the frames, in this particular case the intended extracting information is the license plates and other traffic details. In real life scenario, depending of the concentration of vehicles in the scene, and also on the image characteristics (artifacts, noises, etc) the computation bandwidth to process the frames varies from time to time. This is a dynamically changing scenario, where possibly after some time the computational requirements again falls down due to less concentration of vehicles or change in the ambient conditions resulting is less noises in the image.

The present FPS calculator takes an indirect measure of the computation load including computation requirement and the available computation bandwidth for selecting the candidate video frames which is based on the current fps of the video and the time the system took to process the frames during any prefixed duration of time. If it is found that the total time taken to process the frames is more than the difference in timestamp between the last frame and the first frame in that said duration, the FPS calculator infers that the existing computation bandwidth is insufficient to process all the frames with full ROI and existing fps ("Overloaded" condition).

Figure 1A:
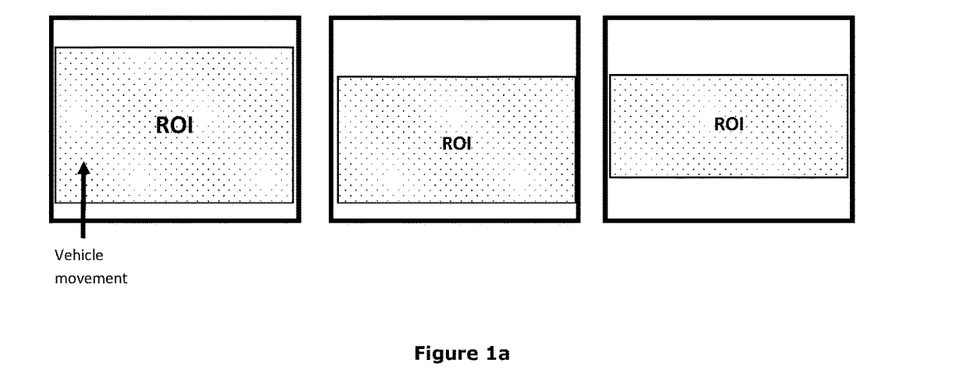

In overloaded condition the FPS calculator reduces the ROI by a pre-fixed amount (say, 10% of the existing ROI) and also can reduce the target FPS by similar pre-fixed percentage, both are independently done based on the domain and type of application. As the system now has to process fewer frames per second and that again with reduced ROI, the computation bandwidth will be within the limit. Again, when the FPS calculator find that the total time required to process all the frames during a certain interval of time is much less than the difference between the last frame and the first frame during that time duration, it increases the ROI and fps. The reduction of the ROI is shown in the FIG. 1a.

In a crowded traffic it is always preferable to process as many frames as possible to localize license plates, as in many frames there could be occlusion of license plate of a vehicle by the body of the other vehicles. But in overloaded situation one can gradually try to tune the system for optimal performance, rather than reaching a situation where the system has to drop multiple frames in sequence, and thus missing one or more vehicles altogether. The adaptive selection of the ROI and the fps is further illustrated in the FIG. 4.

The clock time refers to the time of capture of the frame by the camera. It is different from the computation time to process the frame.

Figure 2:
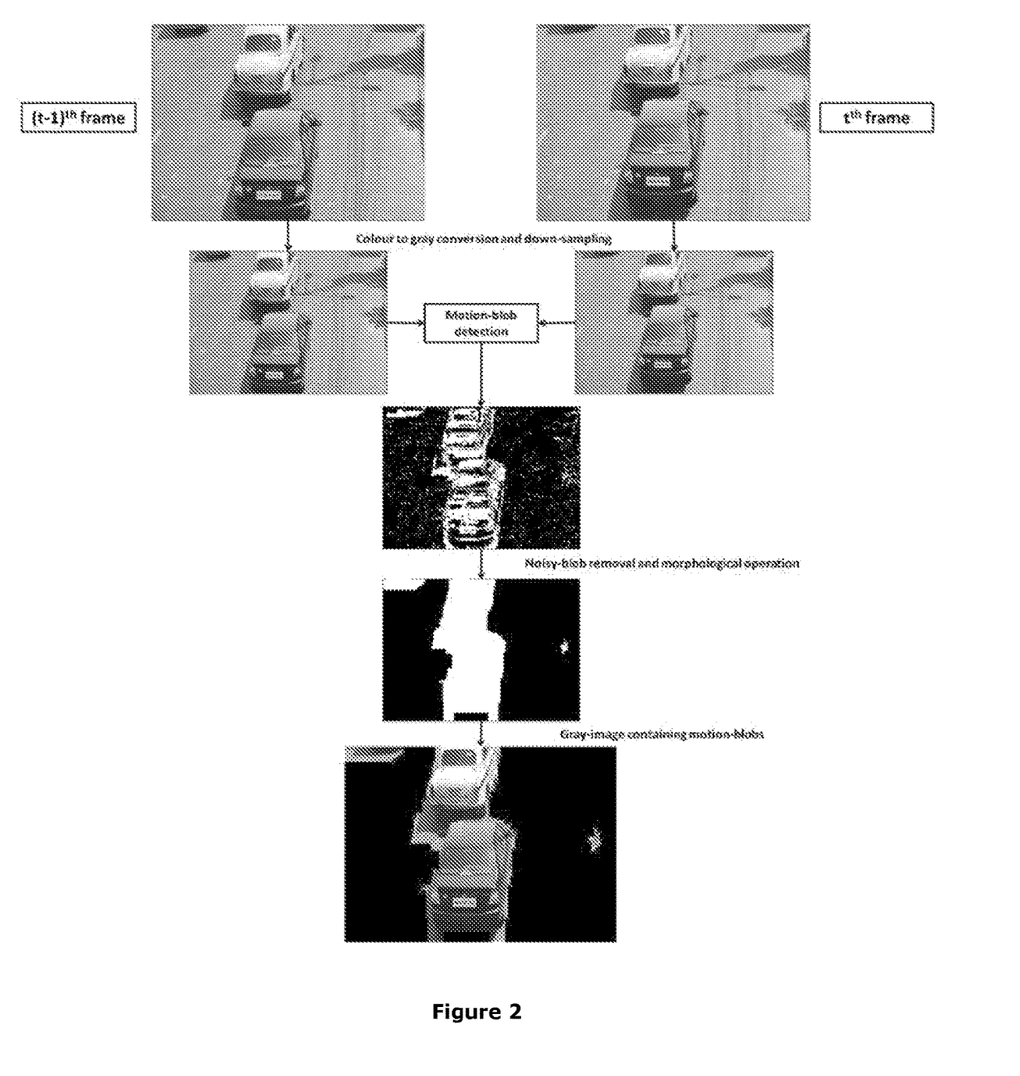
FIG. 2 depicts a block diagram of the system and modules implemented in accordance with the disclosed embodiments regarding finding the ROI in frames with moving vehicles.

The accompanying FIG. 2 shows the block representation of the operation of the Motion region detector [103] to identify the motion regions for the frames. Presence of motion in the frames can be estimated in the compressed domain which requires much less computation and memory bandwidth. In an independent scheme (as shown in FIG. 2), motion regions can be found using generally used (current and previous) frame differencing (or any other computationally inexpensive method) method between two consecutive frames.

But, rather than using the input frames in their original high resolution—it can be modeled to work on a very coarse (i.e., down-sampled by a factor of 1/10th say) version of the input frames. This would not only drastically reduce the computation requirements but many unwanted small noise would also be removed automatically—producing a clearer true motion region binary image. Morphology closing operation can be applied to fill the gaps in detected motion regions. This is required because motion detection scheme based on frame differencing (or similar) technique often does not produce motion regions if the moving object under consideration has similar intensity values in both the current and previous frames (like vehicle with mono-colored body). Connected component analysis (CCA) can be applied to further remove smaller insignificant noisy motion regions. For example, depending on the general settings of the camera installed for automatic license plate recognition (ALPR) application, frames with vehicles just entering (assuming vehicle movement from camera near to far) in the FOV can be discarded from further processing reducing the computational requirement to some extent. This is a reasonable assumption; because when a vehicle just starts to enter in the FOV—its LP might not come in the FOV for several frames as in most cases LPs are installed in the back-lower portion of the vehicle. Therefore, a spatial position constraint can also be applied to discard certain connected components based on their positions in the FOV and as a consequence corresponding frames can be discarded from further processing.

Figure 3:
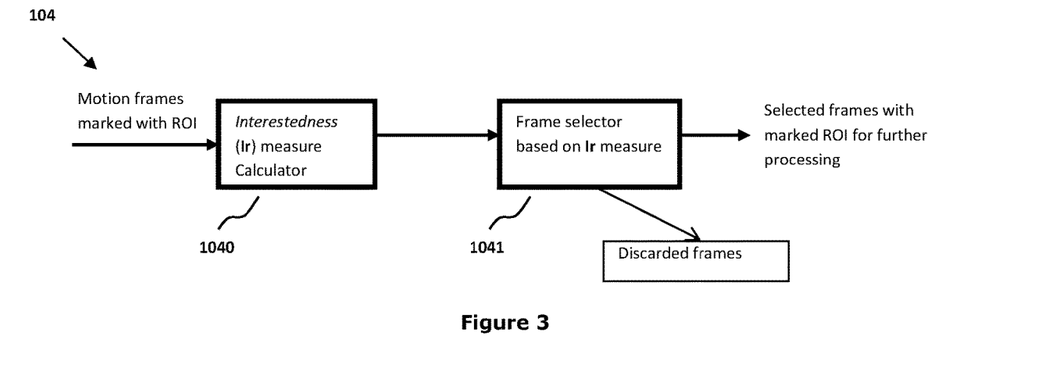
FIG. 3 depicts a block diagram of the system and modules implemented in accordance with the disclosed embodiments regarding frame selection in continuously moving vehicle situation.

The accompanying FIG. 3 depicts the frame selection mechanism implemented in the motion frame processing module [104] for effectively reduction of high overloading situation caused by the moving traffic on a road for a long time period. In another embodiment, FIG. 3 describes an effective solution to the frame buffer overflow problem.

Buffer overloading problem: As the computation time to process a series of frames exceeds the difference in timestamp of the last and the first frame in the series, the frames are accumulated in the buffer. The buffer has a finite length and can accommodate up to a fixed number of frames. Before the buffer overflows, corrective measures (reduced ROI and/or less fps) have to be taken to reduce the computation requirement, so that more frames are processed per second and the buffer is cleared.

In the motion frame processing module [104], the motion frames with marked ROI are passed through an "Interestedness (Ir)" measure calculator [1040] (FIG. 3). Based on the output of [1040] the frame selector module [1041] decides which frames to discard and which frames to process further. This Ir measure can be computed using different characteristics of the frames and is based on the application. As for example, in the following discussion edge characteristic, vehicle position in the FOV etc. are used as the interestedness measures.

Figure 4:
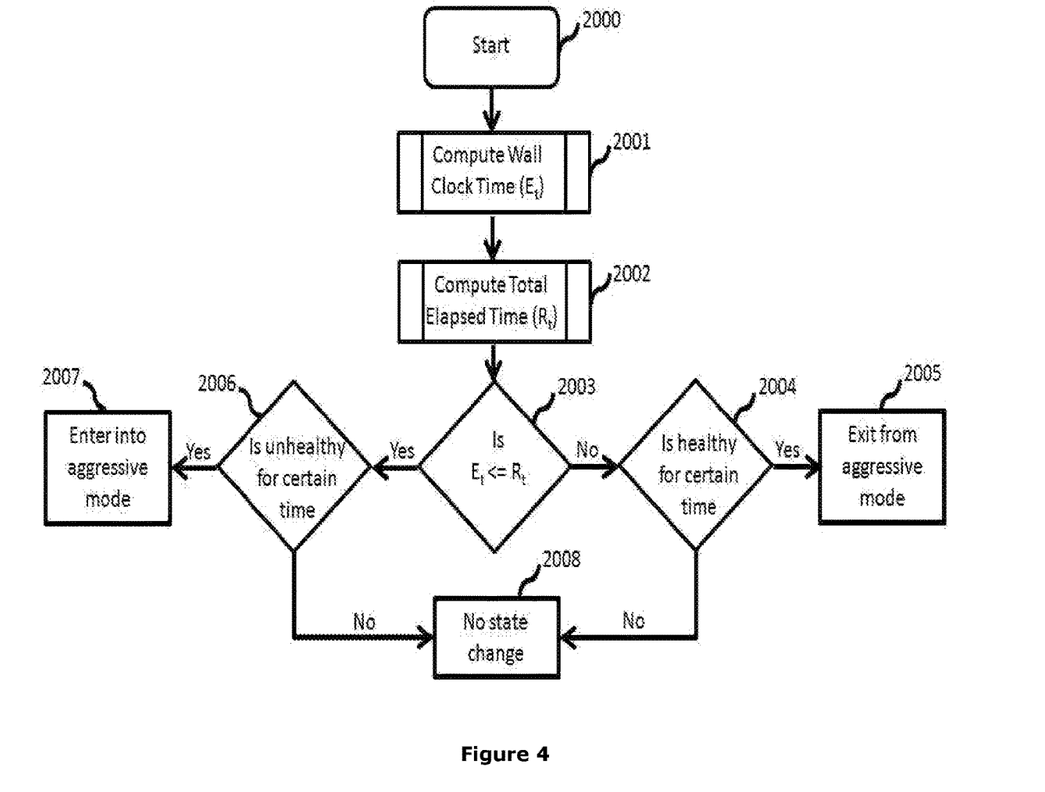
FIG. 4 depicts a block diagram of the system and modules implemented in accordance with the disclosed embodiments regarding adaptive ROI and adaptive FPS selection in long moving traffic environment.

Considering, there are two working modes of the system—namely—aggressive and normal—accompanying FIG. 4 shows the adaptive ROI and adaptive FPS selection in long moving traffic environment. If the system is in aggressive mode then steps must be taken to reduce the processing/computation requirement of the system—so that the overloaded buffer gets a chance to clear its content. Normal mode of the system represents real-time processing situation with no frame buffer overloading problem. In [2001], Et represents the wall clock time collected from input frame's timestamp information (or any other means). The cumulative computation/processing time of each input frame is represented by Rt in [2002]. [2003] checks if the total elapsed/computation/processing time (Rt) is <=the wall clock time (Et). The situation (Et<=Rt) describes the healthy condition of the system—i.e., real-time frame processing. [2004] checks that whether the system is in healthy condition for certain pre-defined time or not. Based on the affirmative output of [2004] and if the system is in aggressive mode then [2005] changes the mode of the system from aggressive to normal. The mode of the system remains the same if [2004] produces a negative output. Similarly, the situation (Et>Rt) the system is in unhealthy condition. This condition needs a recovery mechanism. The recovery can be achieved either by reducing the frame rate of processing or by reducing the region of processing. Once the system remains healthy for certain amount of time it exits from aggressive mode [2005]. If the system is unhealthy for certain time [2006] and is in normal mode then change the state from normal to aggressive.

Figure 5:
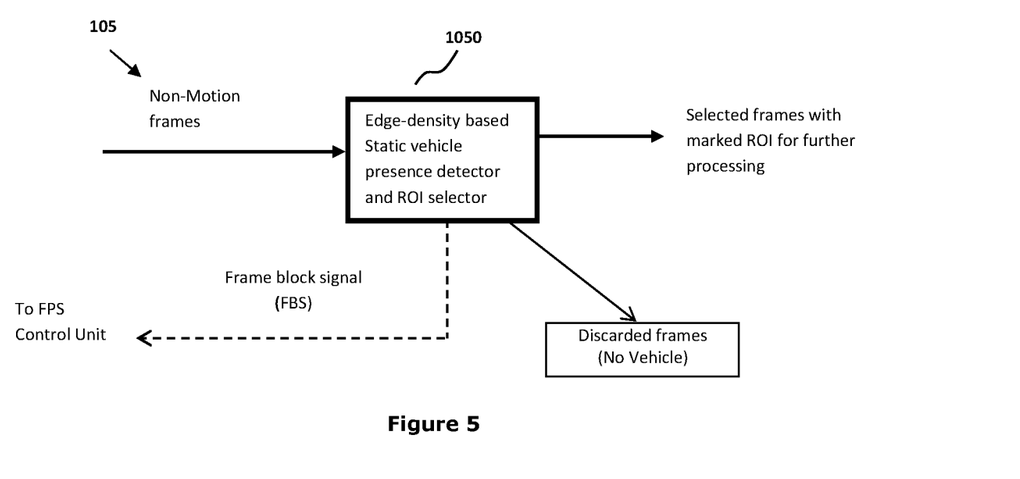
FIG. 5 depicts a block diagram of the system and modules implemented in accordance with the disclosed embodiments regarding frame selection in non-moving vehicle situation.

Accompanying FIG. 5 describes the frame selection mechanism for long stretch non-moving traffic situation as implemented in the non-motion frame processing module [105]. Frames with no-motion [105] are passed to [1050] which based on edge concentration detects the presence of non-moving vehicle in the FOV. [1050] also acts as a ROI selector based on edge regions. If [1050] detects that there is actually no vehicle present in the FOV then the frame is discarded. Additionally, it also sends frame block signal (FBS) information to FPS control unit for FPS control including reducing or stopping image capturing. If it detects that there exists vehicles in the FOV then the corresponding frames are processed further considering the edge ROI selected by [1050].

Figure 6:
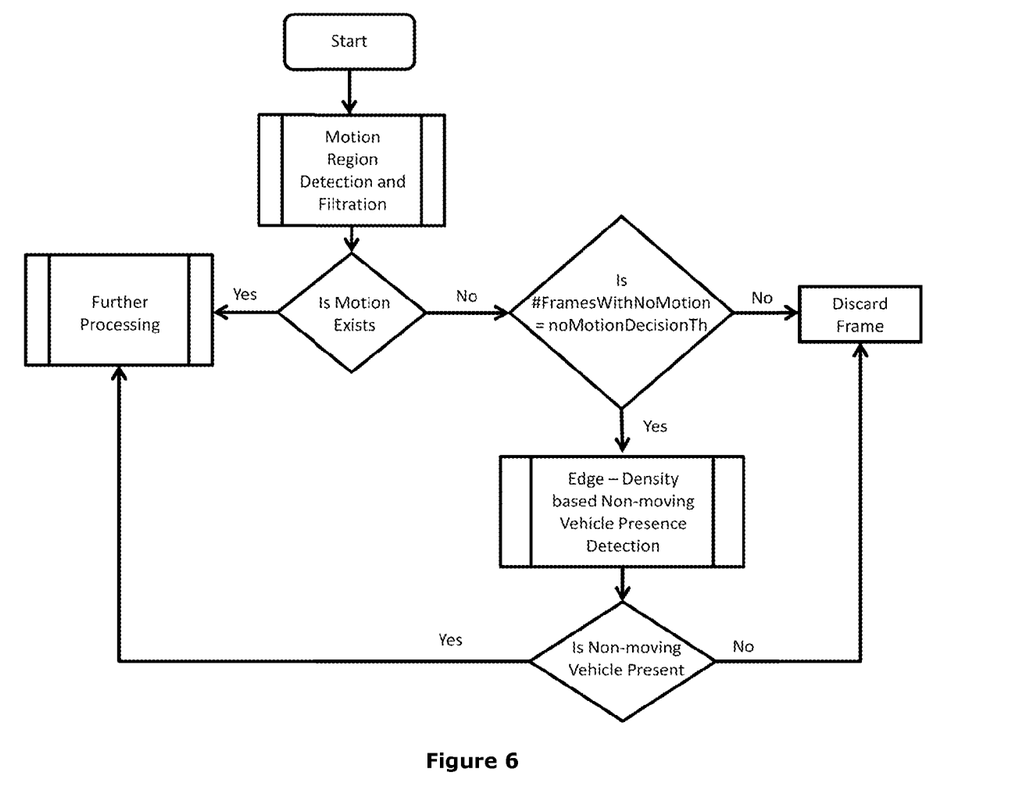
FIG. 6 depicts a block diagram of the system and modules implemented in accordance with the disclosed embodiments regarding motion region detection, vehicle presence detection and FPS calculation.

Accompanying FIG. 6 depicts the flowchart to the problem regarding the selection of frames for further processing in long non-moving traffic situation as implemented in the non-motion frame processing module [105]. The input frames are first analyzed to detect the presence of motion region described in [0152]. If significant amount of motion region is found [1003] then the frame is passed to [1002] for further processing. In case, it is found that there is no significant amount of motion in the frame then this frame is analyzed to check whether the no-motion situation has occurred for empty scene scenario or non-moving vehicle situation. Here, it checks if the number of consecutive no-motion frames (#FramesWithNoMotion) has reached to a previously set no-motion frame counter threshold (noMotionDecisionTh) then the frame is passed to edge density based non-moving vehicle presence detection module for further analysis, otherwise the frame is discarded from further processing. Upon receiving a frame, edge-density based non-moving vehicle presence detection module checks the edge-density of the frame to determine whether there exists any non-moving vehicle in the FOV. If it is found that there does not exist any non-moving vehicle in the FOV then the frame is discarded from rest of the processing. Otherwise, the frame is passed to further analysis. Based on the value of noMotionDecisionTh, set by the user some no-motion frames with non-moving vehicles in it are passed for further processing. In doing so, efficiency of the video based traffic monitoring system gets improved.

Figure 7:
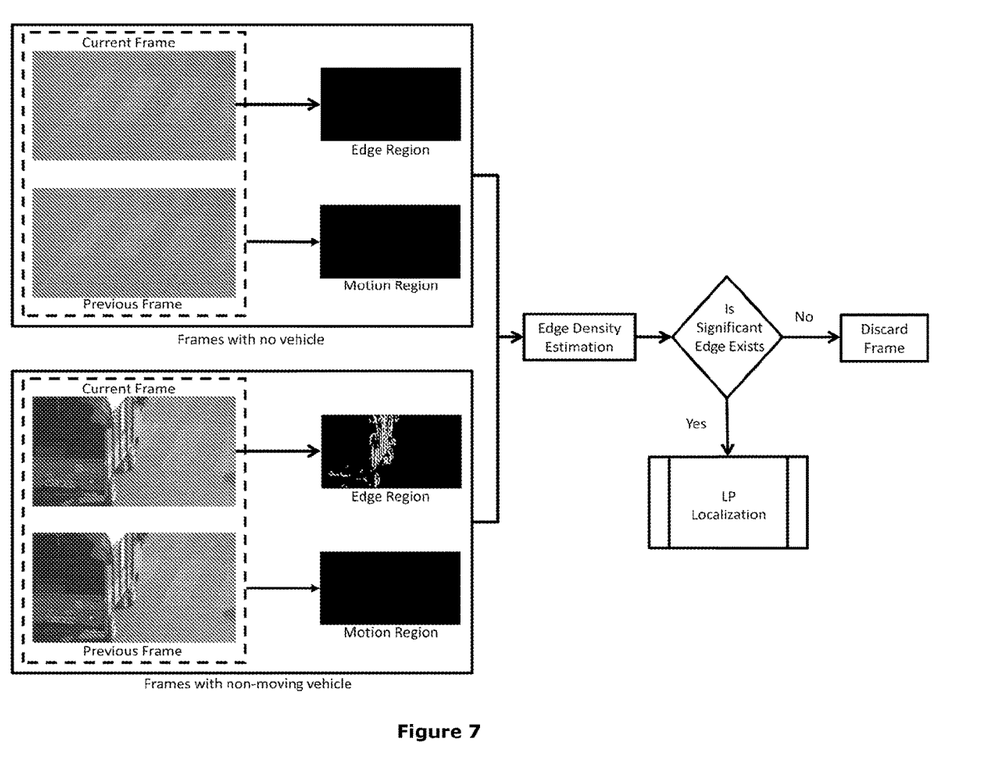
FIG. 7 depicts a block diagram of the system and or module implemented in accordance with the disclosed embodiments regarding motion region detection, vehicle presence detection and FPS calculation.

Accompanying FIG. 7 depicts an example to differentiate non-motion frames occurring due to no vehicle situation from non-motion frames occurring due to non-moving vehicle situation. Upon receiving a frame, it checks the edge-density of the frame to determine whether there is any non-moving vehicle in the FOV. If it is found that there does not exist any non-moving vehicle in the FOV then the frame is discarded from rest of the processing. Otherwise, the frame is passed for further processing. Moreover, based on the edge regions this module also acts as a ROI selector for further processing. FIG. 7 basically describes one of the possible solutions that can be used to differentiate non-motion frames occurring due to no-vehicle situation from non-motion frames occurring due to non-moving vehicle situation. Two examples are shown in the FIG. 7a (modified version of existing FIG. 7) depicting the segregation process of no-motion for no vehicle and no-motion for non-moving vehicles situations.

Figure 7A:
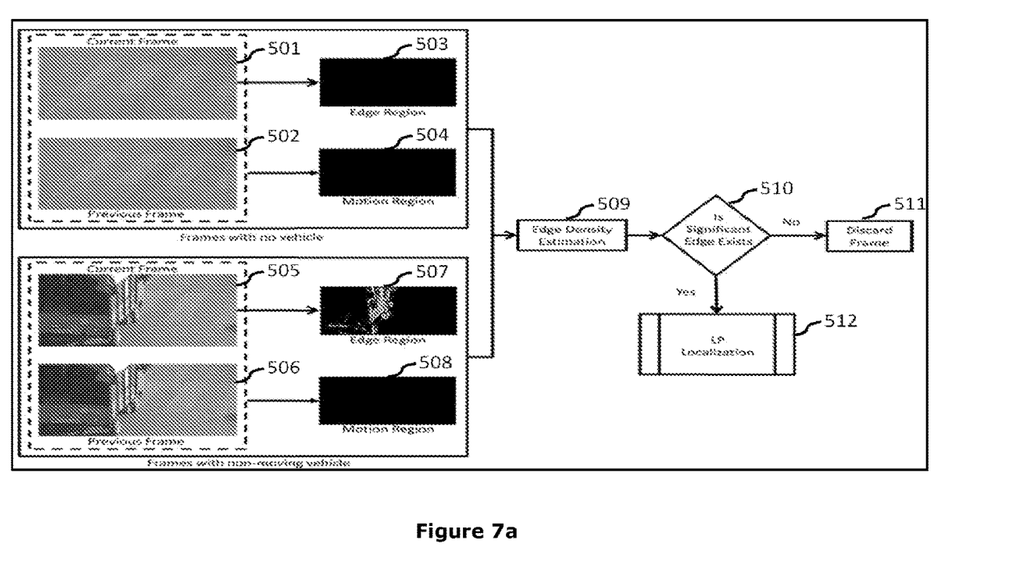

The first example shown in the upper box in the FIG. 7a describes the no-motion for no vehicle situation. It can be seen from the example that when there is no vehicle in two consecutive frames (denoted by current (501) and previous (502) frame)—then motion detection algorithm (like frame differencing, background subtraction etc.) would not detect any motion region in the current frame. This is shown by (504) and is marked by "Motion Region" in the FIG. 1. The "Edge Region" will also not contain any significant amount of edge structure as shown in (503). On the other hand, the second example shown in the lower box in the FIG. 7a depicts the no-motion for non-moving vehicles situation. There exist a vehicle in the FOV, but as there is no movement of the vehicle in between the previous (506) and current (505) frame—as a result there is no "Motion Region" in (508). From the FIG. 7a, it is clear that due to the presence of the vehicle in the FOV—there exist significant amount of vertical edge like structures in the output (507) of the edge detection step. Though in both the cases, there is similar output out of "Motion detection" stage, but the difference in the output from "Edge concentration detection" stage differs.

We claim:

1. A system for selection of candidate video frames from traffic video comprising
    an imaging processor operatively connected to traffic video source;
    said imaging processor receives the traffic video from said traffic video source for selection of said candidate video frames from the received traffic video for analysis of entire traffic video stream to extract vehicles details therefrom including detection of situations of moving vehicles and non-moving vehicles;
    said traffic video is forwarded to the imaging processor from the source at an appropriate rate suitable for selection computation of said candidate video frames;
    wherein the imaging processor comprises
    an FPS calculator to receive the traffic video from said traffic video source and forwarding the candidate video frames of said received traffic video at a selected frame per second (FPS) and with a selected region of importance (ROI) for each forwarding video frame;
    a motion region detector to receive the forwarded video frames and analyzes each of the frame to determine whether the received video frames corresponds to no-motion frames or motion frames;

motion frame processing module operatively interfaced with the motion region detector to receive the motion frames and discarding irrelevant motion frames from the vehicles details extracting analysis to reduce computational overloading situation caused by the moving vehicles; and non-motion frame processing module operatively interfaced with the motion region detector to receive the non-motion frames for distinguishing the no-motion frames whether corresponding to no-vehicle or non-moving vehicle and discarding only the no-motion frames corresponding to the no-vehicle from the vehicles details extracting analysis.

2. The system as claimed in claim 1, wherein the traffic video source includes traffic surveillance camera or image grabber and decoder module.

3. The system as claimed in claim 1, wherein the FPS calculator is adapted to select the FPS and the ROI based on computational load during candidate frames selection including adaptively selecting smaller ROI for each of the video frames being forwarded and/or reducing the FPS adaptively to reduces the computational load.

4. The system as claimed in claim 3, wherein the FPS calculator enables FPS control by involving a FPS control unit to enable FPS control whereby target FPS suitable for the computational load determined by the FPS calculator is communicated to the FPS control unit which is operatively interfaced to the traffic surveillance camera or image grabber and decoder module to change image capturing rate as per the target FPS and forward the video to the FPS calculator as per the target FPS.

5. The system as claimed in claim 3, wherein the FPS calculator is configured to continuously measure of the computation load based on current FPS of the video frames and time taken to process the video frames during any prefixed duration of time, wherein for total time taken to process the video frames is more than difference in timestamp between last frame and first frame in said time duration, the FPS calculator infers overload condition with exiting ROI and existing FPS.

6. The system as claimed in claim 5, wherein the FPS calculator reduces the ROI by a fixed amount and/or the FPS by similar percentage in the overload condition thus enabling processing of fewer video frames per second with reduced ROI to reduce the computational load and when the total time required to process all the video frames during a certain interval of time is much less than the difference between the last frame and the first frame during that time duration, it increases the ROI and fps.

7. The system as claimed in claim 1, wherein the motion region detector is identifies the motion regions for the frames in compressed domain involving frame differencing method between two consecutive frames applying connected component analysis and spatial position constraint to discard certain connected components based on their positions in field of view (FOV).

8. The system as claimed in claim 1, wherein the motion frame processing module includes an Interestedness (Ir) measure calculator to receive the motion frames with marked ROI and calculate Ir value involving characteristics of the video frames and their application including edge characteristic, vehicle position in the FOV; and a frame selector module to decide which frames to be discarded and which frames to be processed further based on the Ir value.

9. The system as claimed in claim 1, wherein the non-motion frame processing module distinguishes the no-motion frames whether corresponding to no-vehicle or non-moving vehicle in the FOV based on edge concentration.

10. The system as claimed in claim 9, wherein the non-motion frame processing module sends frame block signal (FBS) information to FPS control unit for the FPS control including reducing or stopping the image capturing upon detection of no vehicle present in the FOV.

11. The system as claimed in claim 9, wherein the non-motion frame processing module distinguishes the no-motion frames whether corresponding to no-vehicle or non-moving vehicle in the FOV including checking number of consecutive no-motion frames with respect to a previously set no-motion frame counter threshold;

passing the no-motion frames to edge density based non-moving vehicle presence detection module for further analysis if the number of consecutive no-motion frames is reached to the previously set no-motion frame counter threshold, otherwise the no-motion frames are discarded from further processing;

checking edge-density of the frames in the edge-density based non-moving vehicle presence detection module to determine whether there exists any non-moving vehicle in the FOV and discarding the frames from further processing which do not corresponds to any non-moving vehicle in the FOV while rest of the frames are passed to further analysis.

12. A method for selecting candidate video frames from traffic video involving the system as claimed in the claim 1, comprising receiving the traffic video from the traffic video source in the imaging processor;

selecting the candidate video frames from the received traffic video in the imaging processor for analysis of entire traffic video stream to extract vehicles details from therefrom including detection of situations of moving vehicles and non-moving vehicles; and controlling the traffic video is forwarded to the imaging processor from the traffic video source at an appropriate rate suitable for the candidate video frames selection computation.

13. The method as claimed in claim 12, wherein selection of the candidate video frames from the received traffic video in the imaging processor for analysis of the entire traffic video stream to extract vehicles details therefrom including detection of situations of moving vehicles and non-moving vehicles comprises the steps of receiving the traffic video from the source in the FPS calculator and forwarding the video frames of said received traffic video at a selected frame per second (FPS) and with a selected region of importance (ROI) for each forwarding video frame;

receiving the forwarded video frames in the motion region detector and analyzing each frame to determine whether the received video frames corresponds to no-motion frames or motion frames;

involving the motion frame processing module operatively interfaced with the motion region detector to receive the motion frames and discarding irrelevant motion frames from the vehicles details extracting analysis to reduce computational overloading situation caused by the moving vehicles;

involving the non-motion frame processing module operatively interfaced with the motion region detector to receive the non-motion frames for distinguishing the no-motion frames whether corresponding to no-vehicle or non-moving vehicle and discarding only the no-motion frames corresponding to the no-vehicle from the vehicles details extracting analysis; and enabling the FPS control by involving the FPS control unit whereby target FPS suitable for the computational load determined by the FPS calculator is communicated to the FPS control unit which is operatively interfaced to the source to change image/video capturing rate of the source as per the target FPS and forward the video to the FPS calculator as per the target FPS.

* * * * *